United States Patent Office 3,579,545
Patented May 18, 1971

3,579,545
NOVEL 11β-ALKOXY GONA-1,3,5(10)-TRIENES
Daniel Bertin, Montrouge, and Andre Pierdet, Noisy-le-Sec, France, assignors to Roussel-UCLAF, Paris, France
No Drawing. Continuation-in-part of application Ser. No. 643,062, June 2, 1967. This application Aug. 25, 1969, Ser. No. 852,905
Claims priority, application France, Sept. 7, 1966, 75,528; Dec. 9, 1966, 86,879; Feb. 28, 1967, 96,848; Mar. 9, 1967, 98,154
Int. Cl. C07c *169/08*
U.S. Cl. 260—397.5     20 Claims

ABSTRACT OF THE DISCLOSURE

Novel 11β-lower alkoxy-$\Delta^{1,3,5(10)}$-gonatrienes substituted in the 3-position by a member selected from the group consisting of hydroxy, alkoxy of 1 to 4 carbon atoms, cycloalkoxy of 5 to 6 carbon atoms, and acyloxy, wherein the acyl is derived from an organic carboxylic acid having 1 to 18 carbon atoms, in the 13-position by a lower alkyl radical, and in the 17-position by the grouping

wherein X is selected from the group consisting of hydrogen and alkyl of 1 to 4 carbon atoms, and Y is selected from the group consisting of a hydrocarbon radical and a substituted hydrocarbon radical. These compounds possess estrogenic activity.

PRIOR APPLICATION

The present application is a continuation-in-part of copending application Ser. No. 643,062, filed June 2, 1967, now abandoned.

OBJECTS OF THE INVENTION

It is an object of the invention to provide novel 11β-lower alkoxy-$\Delta^{1,3,5(10)}$-gonatrienes substituted in the 3-position by a member selected from the group consisting of hydroxy, alkoxy of 1 to 4 carbon atoms, cycloalkoxy of 5 to 6 carbon atoms, and acyloxy, wherein the acyl is derived from an organic carboxylic acid having 1 to 18 carbon atoms, in the 13-position by a lower alkyl radical, and in the 17-position by the grouping

wherein X is selected from the group consisting of hydrogen and alkyl of 1 to 4 carbon atoms, and Y is selected from the group consisting of a hydrocarbon radical and a substituted hydrocarbon radical.

It is a further object of the invention to provide novel estrogenic compositions.

It is an additional object of the invention to provide a novel method of treating ovarian irregularities and insufficiencies in warm-blooded animals.

These and other objects and advantages of the invention will become obvious from the following detailed description.

THE INVENTION

The invention relates to novel 11-lower alkoxy-$\Delta^{1,3,5(10)}$-gonatrienes substituted in the 3-position by a member selected from the group consisting of hydroxy, alkoxy of 1 to 4 carbon atoms, cycloalkoxy of 5 to 6 carbon atoms, acyloxy, wherein the acyl is derived from an organic carboxylic acid having 1 to 18 carbon atoms, in the 13-position by a lower alkyl radical, and in the 17-position by the grouping

wherein X is selected from the group consisting of hydrogen and alkyl of 1 to 4 carbon atoms, and Y is selected from the group consisting of a hydrocarbon radical and a substituted hydrocarbon radical.

More particularly, the 11-lower alkoxy-$\Delta^{1,3,5(10)}$-gonatrienes of the invention may be substituted in the 2-position by a methyl group, in the 4-position by a methyl group. The B-ring may be substituted by a member selected from the group consisting of a halogen in the 6-position, a lower alkyl in the 6-position, a substituted lower alkyl in the 6-position, and a lower alkyl in the 7-position. When the B-ring is substituted in the 6-position, the substituent is preferably chlorine, methyl, or trifluoromethyl. When the B-ring is substituted in the 7-position, the substituent is preferably a methyl group.

The substituents in the 17-position are preferably selected from the group of pairs consisting of $$\diagup^{OH}_{\diagdown\text{lower alkyl}}, \quad \diagup^{OH}_{\diagdown\text{alkenyl}}, \quad \diagup^{OH}_{\diagdown\text{substituted alkenyl}},$$

$$\diagup^{OH}_{\diagdown\text{alkynyl}}, \quad \diagup^{OH}_{\diagdown\text{substituted alkynyl}}, \quad \diagup^{O\text{-alkyl}}_{\diagdown\text{lower alkyl}}$$

and $$\diagup^{O\text{-alkyl}}_{\diagdown\text{alkynyl}},$$

wherein the alkenyl and alkynyl radicals have 2 to 7 carbon atoms and alkyl radicals have 1 to 7 carbon atoms.

Preferably, the 11-lower alkoxy-$\Delta^{1,3,5(10)}$- gonatrienes of the invention are 11β-alkoxy-17α-hydrocarbyl-$\Delta^{1,3,5(10)}$-gonatrienes of the Formula I

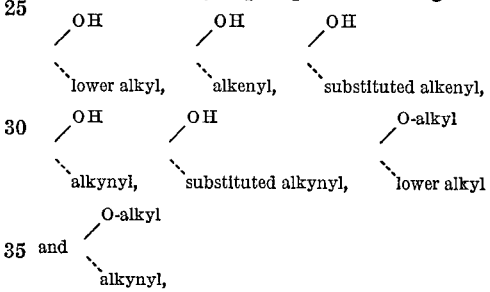

(I)

wherein R and $R_1$ are alkyl of 1 to 4 carbon atoms, $R_2$ is selected from the group consisting of saturated and unsaturated hydrocarbons which may be substituted, $R_3$ is selected from the group consisting of hydrogen, alkyl of 1 to 4 carbon atoms, cycloalkyl of 5 to 6 carbon atoms, and acyl of an organic carboxylic acid of 1 to 18 carbon atoms, $R_4$ is selected from the group consisting of hydrogen and alkyl of 1 to 4 carbon atoms, A is selected from the group consisting of hydrogen and methyl, B is selected from the group consisting of hydrogen and methyl, C is selected from the group consisting of hydrogen, halogen and substituted and unsubstituted lower alkyl, and D is selected from the group consisting of hydrogen and lower alkyl. When $R_4$ and $R_3$ are alkyl, the alkyls are preferably methyl, ethyl, n-propyl, isopropyl and n-butyl.

Examples of suitable organic acids of 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylc acid, pelargonic acid, capric acid, undecylic acid, lauric acid, myristic acid, palmitic acid and stearic acid; alkenoic acids, such as undecylenic acid and oleic acid, cycloakyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-ter.-butylphenoxy acetic acid, 3-phenoxy propionic acid and 4-phenoxy butyric acid; heterocyclic carboxylic acids, such as furane-2-carboxylic acid, 5-ter.-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

The 11-lower alkoxy-$\Delta^{1,3,5,(10)}$-gontrienes of the invention have useful physiological properties, particularly an important estrogenic activity, superior to that of known estrogens such as ethynyl estradiol. This strong estrogenic activity is due to the introduction of the 11β-alkoxy group. This is unexpected since the estrogenic activity of known compounds having an 11β-hydroxyl and a 17α-hydrocarbon radical such as 3-methoxy-17α-methyl-$\Delta^{1,3,5(10)}$-estradiene-11β,17β-diol (Maggerlein, J.A.C.S., p. 2220, 1958) is very weak.

The presence of the 11β-alkoxy group increases in a startling manner the estrogenic activity of the said derivatives of estradiol, in considerable proportions absolutely unforeseen. Moreover, the compounds of the invention although carrying substituents in the 17α-position, are distinguished by the absence of hepatonocivity attested to by the absence of modification of heptiac function in tests on animals. Their prolonged administration proves to be without possible therapeutic risks. For example, 11β-methoxy-17α-ethynyl-$\Delta^{1,3,5(10)}$-estratriene - 3,17β - diol orally administered for four consecutive days to rabbits at the considerable dose of 1 mg./kg. did not entrain any decrease of the amount of heptaic fixation of bromosulfophthalein (BSP), nor an increase of the amount of the transaminase serum glutamyl oxalacetic transaminase (SGOT). The same is true of 11β-methoxy-17α-methyl-$\Delta^{1,3,5(10)}$-estratriene-3,17β-diol.

Examples of suitable compounds are those compounds of Formula I in which R is methyl, ethyl, propyl, or butyl; in which $R_1$ is methyl, ethyl, propyl or butyl; in which $R_3$ is hydrogen, methyl, ethyl, propyl, butyl, cyclopentyl, cyclohexyl, acetyl, propionyl, butyryl, benzoyl, hexahydrobenzoyl, cyclohexylcarbonyl; in which $R_4$ is hydrogen, methyl, ethyl, propyl, butyl; in which $R_2$ is lower alkyl such as methyl, ethyl, propyl and butyl, substituted or unsubstituted alkenyl and alkynyl of 2 to 7 carbon atoms, for example, vinyl, allyl, 2-methyl allyl, haloalkenyl such as halovinyl, e.g., trifluorovinyl, or ethynyl, propynyl, but 2-ynyl, haloalkynyl such as haloethynyl or halopropynyl, e.g., chloroethynyl and trifluoropropynyl; in which C is hydrogen, chlorine, methyl and trifluoromethyl, and in which D is hydrogen and methyl.

Particularly preferred compounds are 11β-methoxy-17α-methyl-$\Delta^{1,3,5(10)}$-estratriene-3,17β-diol, which has a uterotrophic activity 20 to 25 times greater than ethynyl estradiol and 40 times greater than 17α-methyl-$\Delta^{1,3,5(10)}$-estratriene-3,17β-diol. Moreover, the said compound possesses a hypocholesteroleminant activity at a dose of 1 γ/kg. and an antizygotic activity superior to that of ethynyl estradiol. 11β-methoxy-17α-ethynyl-$\Delta^{1,3,5(10)}$ - estratriene-3,17β-diol posseses an estrogenic activity about 20 times greater than ethynyl estradiol.

The process for the preparation of the 11-lower alkoxy-$\Delta^{1,3,5(10)}$-gonatrienes of the invention comprises isomerizing a corresponding 11β-lower alkoxy-$\Delta^{4,9}$-gonadiene-3-one in the presence of a dehydrogenation catalyst, preferably palladium hydroxide, to form the corresponding 11-lower alkoxy-$\Delta^{1,3,5(10)}$-gonatriene-3-ol which is optionally converted into the corresponding ether or ester derivatives by means of etherification or esterification agents.

The 11-lower alkoxy-$\Delta^{1,3,5(10)}$-gonatrienes of the invention may also be prepared by reacting a corresponding 11-lower alkoxy-$\Delta^{1,3,5(10)}$-gonatriene-17-one with an organo metallic compound wherein the organo radical is Y as defined hereinbefore, to obtain the corresponding 11-lower alkoxy-17α-Y-$\Delta^{1,3,5(10)}$-gonatriene-17β-ol which is optionally converted into the corresponding ether or ester derivatives by means of etherification or esterification agents.

More particularly, the process for the preparation of 11β - alkoxy - 13β-lower alkyl-17α-hydrocarboyl-$\Delta^{1,3,5(10)}$-gonatriene-3,17β-diols of the Formula I comprises isomerizing an 11β-alkoxy-13β-lower alkyl-17-oxygenated-$\Delta^{4,9}$-gonadiene-3-one of the formula

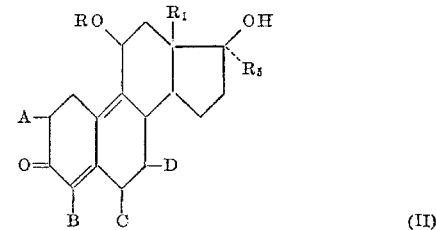

(II)

wherein R, $R_1$, A, B, C and D have the above definitions, and $R_5$ is selected from the group consisting of substituted or unsubstituted saturated hydrocarbons, in the presence of a dehydrogenation catalyst, preferably palladium hydroxide, to form the corresponding 11β-alkoxy-13β-lower alkyl - 17α - $R_5$ - $\Delta^{1,3,5(10)}$-gonatriene-3,17β-diol. The said product may be esterified with an esterification agent derived from an organic carboxylic acid of 1 to 18 carbon atoms such as the acid anhydride or acid chloride in the presence of a basic agent such as pyridine, triethylamine or an alkali metal hydroxide to form the corresponding 3-ester or etherified with an etherification agent such as an alkyl sulfate of 1 to 4 alkyl carbon atoms in the presence of an alkaline agent such as alkali metal hydroxide or a cycloalkyl halide in the presence of an alkaline agent such as sodium hydride to form the 3-ether which may be reacted with alkyl halide of 1 to 4 carbon atoms in the presence of an alkali metal hydride to form the corresponding 3,17β-dialkoxy derivative.

Also, an 11β - OR - 13β-$R_1$-$\Delta^{1,3,5(10)}$-gonatriene-3-ol-17-one may be reacted with an organo metallic compound wherein the organo radical is $R_2$ to form the corresponding 11β-OR-13β-$R_1$-17α-$R_2$-$\Delta^{1,3,5(10)}$-gonatriene-3,17β-diol which may be esterified and/or etherified as above described. Examples of suitable organo metallic compounds are organo magnesium halides wherein the halide may be chloride, iodide or bromide, organo-lithium and organo alkali metal such as sodium or potassium acetylide. A 17α-alkynyl derivative of Formula I can be hydrogenated in the presence of a platinum or palladium base catalyst to form the corresponding 17α-alkenyl derivative.

The starting $\Delta^{4,9}$-gonadienes can be prepared by the process described in copending, commonly assigned U.S. patent application Ser. No. 587,001, filed Oct. 17, 1966, now Pat. No. 3,472,884, which comprises reacting a $\Delta^{4,9}$-gonadiene-11β-ol-3-one with a lower alkanol in the presence of a strong acid in an aprotic solvent to form the corresponding 11β-alkoxy derivative or as described in our copending, commonly assigned U.S. patent application Ser. No. 643,061, filed June 2, 1967, now Pat. No. 3,526,648.

The novel estrogenic compositions of the invention are comprised of a small but estrogenic amount of at least one compound of the invention and a major amount of a pharmaceutical carrier. Preferably, the estrogenic material is a compound of the Formula I. The compositions may be in the form of injectable solutions or suspensions, put up in ampoules or multiple-dose flacons, in the form of implants, tablets, coated tablets, sublingual tablets, capsules, suppositories, ovules and ointments prepared by known methods.

The novel method of the invention for treating ovarian irregularities and insufficiencies in warm-blooded animals comprises administering to warm-blooded animals a safe and effective amount of at least one compound of the invention. Preferably, the method is performed by administering a safe and effective amount of at least one compound of the Formula I.

The said compounds may be administered orally, perlingually, transcutaneously, rectally or topically. The useful dosage is 0.1 to 50 γ/kg. in the adult depending upon the method of administration and the specific product employed. The method is suitable for treating amenorrhea, dysmenorrhea, repeated abortions, premenstrual disturbances and menopause. When used for human therapy, the useful dosage lies between 20 and 200 γ per day.

In the following examples there are described several preferred embodiments to illustrate the invention. However, it should be understood that the invention is not intended to be limited to the specific embodiments.

EXAMPLE 1

Preparation of 11β-methoxy-17α-methyl-$\Delta^{1,3,5(10)}$-estradiene 3,17β-diol Step A: Preparation of 11β-hydroperoxy-17α-methyl-$\Delta^{4,9}$-estradiene-17β-ol-3-one.—2.814 gm. of 17α-methyl-$\Delta^{5(10),9(11)}$-estradiene-17β-ol-3-one were dissolved in 28 cc. of ethanol containing 1% of triethylamine and a stream of oxygen bubbled through the solution for a period of 4 hour under agitation, after which the solution was distilled to dryness. The residue formed was dissolved in 40 cc. of methanol and the solution was treated with carbon black, agitated for 30 minutes and filtered. The filter was washed with methanol. Next, the filtrates were again treated with carbon black, agitated for 30 minutes, filtered and distilled to dryness under vacuum to obtain 3.018 gm. of raw hydroperoxide. The said raw product was then dissolved in 10 cc. of ethyl acetate; the solution was iced and vacuum filtered. The precipitate was washed first with iced ethyl acetate, then with isopropyl ether and dried under vacuum to obtain 2.09 gm. (yield=69.5%) of 11β-hydroperoxy-17α-methyl-$\Delta^{4,9}$-estradiene-17β-ol-3-one, having a melting point of 194° C. (decomposition). The product occurred in the form of colorless cubes which were soluble in alcohol, acetone, benzene and chloroform, slightly soluble in ether and insoluble in water.

Ultraviolet spectra (in ethanol):

Max. at 213 mμ
$$E_{1\ cm.}^{1\%}=161$$
Max. at 234 mμ
$$E_{1\ cm.}^{1\%}=144$$
Inflection toward 239 mμ
$$E_{1\ cm.}^{1\%}=143$$
Max. at 298 mμ
$$E_{1\ cm.}^{1\%}=607$$

Step B: Preparation of 17α-methyl-$\Delta^{4,9}$-estradiene-11β,17β-diol-3-one.—3.28 gm. of 11β-hydroperoxy-17α-methyl-$\Delta^{4,9}$-estradiene-17β-ol-3-one were suspended in 16 cc. of ethanol and 1.6 cc. of triethylphosphite were added thereto. The suspension was maintained at reflux for one hour and then returned to room temperature, after which a mixture of 1.6 cc. of water and 1.6 cc. of 30% hydrogen peroxide was added. Then the suspension was agitated for one hour and extracted with methylene chloride. The organic phases were washed with water, dried over sodium sulfate and distilled to dryness under vacuum to obtain 4.236 gm. of raw 17α-methyl-$\Delta^{4,9}$-estradiene-11β-diol-3-one, which was purified by chromatography through magnesium silicate with elution with methylene chloride containing 15% acetone, followed by recrystallization from ethyl acetate. 2.149 gm. of 17α-methyl - $\Delta^{4,9}$-estradiene - 11β,17β-diol-3-one having a melting point of 197° C. and a specific rotation of $[\alpha]_D^{20}=-25°$ (c.=0.4% in dioxane) were thus obtained in the form of colorless needles, which were soluble in alcohol, acetone, benzene and chloroform, slightly soluble in ether and insoluble in water.

*Analysis.*—$C_{19}H_{26}O_3$ (molecular weight=302.4). Calculated (percent): C, 75.45%; H, 8.66%. Found (percent): C, 75.4; H, 8.7.

Ultraviolet spectra (in ethanol):

Inflection toward 231 mμ
$$E_{1\ cm.}^{1\%}=152$$
Max. at 298 mμ
$$E_{1\ cm.}^{1\%}=658$$

Infrared spectra (in chloroform):
Presence of —OH at 3610 cm.$^{-1}$
Presence of ketone conjugated at 1663 cm.$^{-1}$
Presence of C=C complexes:
  max. at 1617 cm.$^{-1}$
  shoulder toward 1600 cm.$^{-1}$ Step C: Preparation of 11β-methoxy-17α-methyl-$\Delta^{4,9}$-estradiene-17β-ol-3-one.—500 mg. of 17α-methyl-$\Delta^{4,9}$-estradiene-11β,17β-diol-3-one were dissolved in 25 cc. of methylene chloride containing 0.5% methanol and after 0.12 cc. of 65% perchloric acid was added, the solution was agitated for 2 minutes at room temperature. Then one volume of water was added and the organic phase was washed with water, dried over sodium sulfate, filtered and evaporated to dryness under vacuum to obtain 466 mg. (yield=89%) of 11β-methoxy-17α-methyl-$\Delta^{4,9}$-estradiene-17β-ol-3-one, which was utilized as such for the next step.

Step D: Preparation of 11β - methoxy - 17α - methyl-$\Delta^{1,3,5(10)}$-estratriene-3,17β-diol.—466 mg. of 11β-methoxy-17α-methyl-$\Delta^{4,9}$ - estradiene - 17β-ol-3-one were dissolved in 46 cc. of methanol and 466 mg. of palladium hydroxide were added and the solution was held at reflux for one hour under agitation and an atmosphere of nitrogen. Then the solution was filtered, concentrated under vacuum until crystallization started, iced for 30 minutes, and vacuum filtered. The precipitate was washed with iced methanol and dried to obtain 300 mg. (65% yield) of 11β-methoxy - 17α-methyl-$\Delta^{1,3,5(10)}$ - estratriene-3,17β-diol having a melting point of 238° C. and a specific rotation of $[\alpha]_D^{20}=+78.5°$ (c.=1% in ethanol).

Ultraviolet spectra (in ethanol):

Inflection toward 220 mμ
$$E_{1\ cm.}^{1\%}=209$$
Inflection toward 229 mμ
$$E_{1\ cm.}^{1\%}=155$$
Max. at 281 mμ
$$E_{1\ cm.}^{1\%}=58.7$$
Inflection toward 287 mμ
$$E_{1\ cm.}^{1\%}=53.6$$

This compound is not described in the literature.
In an analogous manner, starting with 11β-ethoxy-17α-methyl-$\Delta^{4,9}$-estradiene-17β-ol-3-one,
11β-isopropoxy-17α-methyl-$\Delta^{4,9}$-estradiene-17β-ol-3-one,
11β-methoxy-17α-ethyl-$\Delta^{4,9}$-estradiene-17β-ol-3-one and
6-chloro-11β-methoxy-17α-methyl-$\Delta^{4,9}$-estradiene-17β-ol-3-one, respectively, 11β-ethoxy-17α-methyl-$\Delta^{1,3,5(10)}$-estratriene-3,17β-diol, 11β-isopropoxy-17α-methyl-Δ$^{1,3,5(10)}$-estratriene-3,17β-diol,
11β-methoxy-17α-ethyl-Δ$^{1,3,5(10)}$-estratriene-3,17β-diol and
6-chloro-11β-methoxy-17α-methyl-Δ$^{1,3,5(10)}$-estratriene-3,17β-diol were obtained.

These compounds are not described in the literature.

EXAMPLE 2

Preparation of 11β-methoxy-17α-ethynyl-Δ$^{1,3,5(10)}$-estratriene-3,17β-diol

Step A: Preparation of 11β - methoxy-Δ$^{4,9}$-estradiene-3,17-dione.—0.5 gm. of Δ$^{4,9}$-estradiene-11β-ol-3,17-dione were dissolved at room temperature in 25 cc. of methylene chloride containing 2‰ of methanol and after 5 mg. of p-toluene-sulfonic acid were added, the reaction mixture was agitated for several minutes. Then the reaction mixture was poured into ice water, washed with water until the wash waters were neutral, and distilled to dryness under vacuum. The resulting residue was crystallized from ethyl ether to obtain 0.46 gm. of 11β-methoxy-Δ$^{4,9}$-estradiene - 3,17 - dione having a melting point of 140° C.

The product occurred in the form of prisms, insoluble in water and dilute aqueous acids and alkalis, and soluble in most of the usual organic solvents.

In an analogous manner, Δ$^{4,9}$-estradiene-11β-ol-3,17-dione was converted by the action of methylene chloride containing 2‰ of ethanol in the presence of p-toluene-sulfonic acid into 11β-ethoxy-Δ$^{4,9}$-estradiene-3,17-dione.

Step. B: Preparation of 11β-methoxy-Δ$^{1,3,5(10)}$-estratriene -3-ol-17-one.—12.3 gm. of 11β-methoxy-Δ$^{4,9}$-estradiene-3,17-dione were dissolved in 1,230 cc. of methanol and then, under an atmosphere of nitrogen, 7.38 gm. of palladium hydroxide were added and the mixture was held at reflux for one hur under agitation and a nitrogen atmosphere. Then the reaction mixture was cooled to 30° C., filtered, vacuum filtered and washed with methanol. The methanolic solutions were concentrated to about 50 cc., allowed to stand overnight at room temperature and filtered. The precipitate formed was triturated in methanol and dried at 80° C. to obtain 10.74 gm. (yield=87.5%) of 11β-methoxy-Δ$^{1,3,5(10)}$- estratriene-3-ol-17-one having a melting point of 264° C.

Step C: Preparation of 11β-methoxy-17α-ethynyl-Δ$^{1,3,5(10)}$-estratriene-3,17β-diol.—Under agitation and an atmosphere of nitrogen, 12 gm. of potassium were heated at 80° C. in 180 cc. of ter.-amyl alcohol. The mixture was agitated for 30 minutes, cooled to 20° C. and after 60 cc. of dioxane were added thereto, a stream of acetylene was allowed to bubble through the mixture for one hour and fifteen minutes. Then a solution of 3 gm. of 11β-methoxy-Δ$^{1,3,5(10)}$-estratriene-3-ol-17-one in 50 cc. of dioxane was added and the mixture was agitated for 4 hours while continuing the passage of acetylene at room temperature. Thereafter, 50 cc. of a 50% aqueous acetic acid solution was added and the mixture was poured into water and extracted with ether. The organic phases were washed first with an aqueous solution containing 10% of neutral sodium carbonate, then with water until the wash waters were neutral, dried over sodium sulfate and concentrated under vacuum until crystallization started. The reaction mixture was iced for one hour, vacuum filtered and the precipitate dried under vacuum to obtain 3.8 gm. of the raw 17α-ethynyl derivative, which was purified by dissolution in ethyl acetate at reflux and by icing to obtain 2.33 gm. (yield=77%) of 11β-methoxy-17α-ethynyl-Δ$^{1,3,5(10)}$-estratriene-3,17β-diol, having a melting point of 280° C. and a specific rotation $[\alpha]_D^{20}=+29°$ (C.=0.6% in ethanol).

Anaylsis.—$C_{21}H_{26}O_3$ (molecular weight=326.42): Calculated (percent): C, 77.27; H, 8.03., Found (percent): C, 77.1; H, 7.8.

Ultraviolet spectra (in ethanol):

Inflection toward 218 mμ

$$E_{1\ cm.}^{1\%}=214$$

Inflection toward 221 mμ

$$E_{1\ cm.}^{1\%}=211$$

Inflection toward 229 mμ

$$E_{1\ cm.}^{1\%}=157$$

Max. at 280 mμ

$$E_{1\ cm.}^{1\%}=58.4$$

Inflection toward 286 mμ

$$E_{1\ cm.}^{1\%}=53.2$$

This compound is not described in the literature.
In an analogous manner,

11β-ethoxy-17α-ethynyl-Δ$^{1,35(10)}$-estratriene-2,17β-diol,
11β-propoxy-17α-ethynyl-Δ$^{1,3,5(10)}$-estratriene-3,17β-diol,
2,4-dimethyl-11β-methoxy-17α-ethynyl-Δ$^{1,3,5(10)}$-estratriene-3,17β-diol,
7α-methyl-11β-methoxy-17α-ethynyl-Δ$^{1,3,5(10)}$-estratriene-3,17β-diol,
11β-methoxy-17α-chloroethynyl-Δ$^{1,3,5(10)}$-estratriene-3,17β-diol,
6α-methyl-11β-methoxy-17α-ethynyl-Δ$^{1,3,5(10)}$-estratriene-3,17β-diol and
11β-dimethoxy 17α-ethynyl-Δ$^{1,3,5(10)}$-estratriene-17β-ol were prepared.

By hydrogenation of 11β - methoxy - 17α - ethynyl-Δ$^{1,3,5(10)}$-estratriene-3,17β-diol in the presence of a palladium catalyst, there was obtained 11β-methoxy-17α-vinyl-Δ$^{1,3,5(10)}$-estratriene-3,17β-diol.

These compounds are not described in the literature.

EXAMPLE 3

Preparation of 11β-methoxy-17α(2'-methyl)-allyl-Δ$^{1,3,5(10)}$-estratriene-3,17β-diol Step A: Preparation of magnesium compound.—Under agitation and an atmosphere of nitrogen, 1 gm. of magnesium shavings, 4 cc. of anhydrous ether and finally 0.5 cc. of 2-methyl-allyl chloride were introduced into a round-bottom flask. The temperature was maintained at 20° C., and a solution of 3.5 cc. of 2-methyl-allyl chloride in 36 cc. of anhydrous ether was added dropwise to obtain a suspension of 2-methyl-allyl magnesium chloride which titrated 0.6 mol/liter.

Step B: Condensation.—600 mg. of 11β-methoxy-Δ$^{1,3,5(10)}$-estratriene-3-ol-17-one and 5 cc. of anhydrous tetrahydrofuran were admixed under agitation and an atmosphere of nitrogen. While maintaining the agitation, 15 cc. of the magnesium suspension obtained in Step A were added to the suspension which was then diluted with 20 cc. of tetrahydrofuran and agitated at room temperature for 15 hours. Then the reaction suspension was heated at reflux for 30 minutes, cooled and poured into 20 cc. of an N-hydrochloric acid-ice mixture. Next, the reaction mixture was extracted with methylene chloride; the organic phase was washed with water, dried and distilled to dryness. The resulting residue was triturated in benzene at reflux, washed first with benzene then ether. The product thus obtained was purified by recrystallization from a methanol-methylene chloride mixture to obtain 512 mg. of 11β-methoxy-17α-(2'-methyl)allyl-Δ$^{1,3,5(10)}$-estratriene-3,17β-diol having a melting point of 272° C. and a specific rotation $[\alpha]_D^{20}=+117°\pm2.5°$ (c.=0.9% in dioxane).

Analysis.—$C_{23}H_{32}O_3$ Calculated (percent): C, 77.49; H, 9.05. Found (percent): C, 77.5; H, 9.0.

The product was soluble in ethanol and chloroform and insoluble in ether.

This compound is not described in the literature.

EXAMPLE 4

Preparation of 11β-methoxy-17α-but-2'-ynyl-Δ$^{1,3,5(10)}$-estratriene-3,17β-diol Step A: Preparation of magnesium compound.—6.33 gm. of magnesium shavings, 6 cc. of anhydrous ether and 13 mg. of mercuric chloride were admixed while agitating and under an atmosphere of nitrogen, and then 1 cc. of a solution of 8.8 gm. of 2-butyne bromide in 60 cc. of anhydrous ether was added thereto. Initiation of the reaction occurred and the addition of the 2-butyne bromide in anhydrous ether was pursued for 3 hours to obtain a solution of 2-butyne magnesium bromide, which was immediately utilized for Step B.

Step B: Condensation.—1,450 mg. of 11β-methoxy-Δ$^{1,3,5(10)}$-estratriene-3-ol-17-one were added to the magnesium solution prepared as described in Step A followed by dropwise addition of 10 cc. of anhydrous tetrahydrofuran. The solution was agitated overnight, then diluted with 20 cc. of tetrahydrofuran, agitated for one hour and poured into 100 cc. of iced water. The reaction mixture was acidified with dilute hydrochloric acid, and then extracted with ethyl acetate. The organic phase was washed with water, dried and distilled to dryness. The residue was dissolved in an ethanol-benzene mixture and the solution was concentrated and benzene was added thereto until crystalilzation started. Then the mixture was vacuum filtered and the precipitate was washed with ether. The product thus obtained was purified by recrystalilzation from an ethanol-chloroform mixture, then from ethanol to obtain 580 mg. of 11β-methoxy-17α-but-2'-ynyl-Δ$^{1,3,5(10)}$-estratriene-3,17β-diol having a melting point of 282° C. and a specific rotation of $[\alpha]_D^{20}=+76°$ (c.=0.9% in dioxane). The product was soluble in dioxane and insoluble in ether.

*Analysis.*—$C_{23}H_{30}O_3$ (molecular weight=354.47): Calculated (percent): C, 77.93; H, 8.53. Found (percent): C, 77.8; H, 8.7.

R.M.N. spectra:

|  | Hz. |
|---|---|
| 18 methyl | 57.5 |
| $CH_3$—C≡C | 105.8 |
| $CH_3O$— | 190.5 |

This compound is not described in the literature.

EXAMPLE 5

Preparation of 11β-methoxy-13β-ethyl-17α-ethynyl-Δ$^{1,3,5(10)}$-gonatriene-3,17β-diol Step A: 11β-methoxy-13β-ethyl-Δ$^{4,9}$-gonadiene - 3,17-dione.—3 gm. of 13β-ethyl-Δ$^{4,9}$-gonadiene-11β-ol-3,17-dione were dissolved in 200 cc. of chloroform containing 2 parts per thousand of methanol. Then 0.6 cc. of a 65% perchloric acid solution were added while vigorously agitating. The agitation was continued for 2 minutes at room temperature and the solution was then poured into an ice-water mixture. The organic phase was separated by decantation and evaporated to dryness under vacuum. There were obtained 3.1 gm. of 11β-methoxy-13β-ethyl-Δ$^{4,9}$-gonadiene-3,17-dione which were recrystallized from ethyl ether. Melting point: 179° C.

Step B: 11β-methoxy-13β-ethyl-Δ$^{1,3,5(10)}$-gonatriene-3-ol-17-one.—0.55 gm. of 11β-methoxy-13β-ethyl-Δ$^{4,9}$-gonadiene-3,17-dione were dissolved in 60 cc. of methanol. 500 mgm. of palladium hydroxide were added thereto. The mixture was refluxed for one hour and a half while agitating under an atmosphere of nitrogen. The catalyst was separated by filtration and the solution was concentrated under vacuum until crystallization occurred. The mixture was then cooled to 0° C. for 30 minutes. The precipitate was separated by filtration, washed with iced methanol and dried. There were obtained 0.32 gm. of 11β-methoxy-13β-ethyl-Δ$^{1,3,5(10)}$-gonatriene-3-ol-17-one, which melted at 237° C.

Step C: 11β-methoxy-13β-ethyl-17α-ethynyl-Δ$^{1,3,5(10)}$-gonatriene-3,17β-diol.—6.5 gm. of potassium in 100 cc. of tert.-amyl alcohol were heated to between 70° and 80° C. for half an hour, while agitating under an atmosphere of nitrogen. The mixture was then cooled to 20° C. 30 cc. of dioxane were added, and a stream of acetylene was allowed to bubble therethrough for one hour at room temperature. Then 2.3 gm. of 11β-methoxy-13β-ethyl-Δ$^{1,3,5(10)}$-gonatriene-3-ol-17-one were added and the mixture was agitated for 4 hours at 20° C. while the bubbling of acetylene was continued. 25 cc. of a 50% aqueous acetic acid solution were then added. Thereafter, the reaction mixture was poured into 600 cc. of water and extracted with ethyl ether. The extracts were washed with a 10% aqueous sodium carbonate solution and then with water. The organic solution was dried and concentrated under an atmosphere of nitrogen until crystallization occurred. The mixture was cooled to 0° C. The precipitate was separated by filtration. There was obtained 1.9 gm. of 11β-methoxy-13β-ethyl-17α - ethynyl-Δ$^{1,3,5(10)}$-gonatriene-3,17β-diol, which melted at 265° C.

As far as is known, this compound is not described in the literature.

EXAMPLE 6

Preparation of 3,11β-dimethoxy-17α-methyl-Δ$^{1,3,5(10)}$-estratriene-17β-ol 0.1 gm. of 11β-methoxy-17α-methyl-Δ$^{1,3,5(10)}$-estratriene-3,17β-diol was introducel into 1 cc. of acetone. 0.25 cc. of a 2 N sodium hydroxide solution were then added. The whole was refluxed until complete dissolution, and 0.4 cc. of a 10% dimethyl sulfate solution in acetone were added. The mixture was refluxed for 30 minutes while agitating. Then 0.12 cc. of a 2 N sodium hydroxide solution and 0.2 cc. of a 10% dimethyl sulfate solution in acetone were added. Thirty minutes later, the reaction mixture was cooled and poured into a water-ice mixture. The precipitate was separated by filtration, washed with water and dried. There was obtained 0.1 gm. of 3,11β-dimethoxy-17α-methyl-Δ$^{1,3,5(10)}$-estratriene-17β-ol which was recrystallized from a methylene chloride-isopropyl ether mixture. Melting point: 144° C.

As far as is known, this compound is not described in the literature.

In an analogous manner, starting with 11β-methoxy-17α-ethynyl-Δ$^{1,3,5(10)}$-estratriene-3,17β-diol, there was obtained 3,11β - dimethoxy-17α-ethynyl-Δ$^{1,3,5(10)}$-estratriene-17β-ol.

This compound is not described in the literature.

EXAMPLE 7

Preparation of 3,11β-trimethoxy-17α-ethynyl-Δ$^{1,3,5(10)}$-estratriene 2.15 gm. of 11β-methoxy-17α-ethynyl-Δ$^{1,3,5(10)}$-estratriene-3,17β-diol were dissolved in 40 cc. of tetrahydrofuran. 8 cc. of methyl iodide were added thereto. The whole was cooled to between −30° and −40° C. and a solution of 4 gm. of potassium tert.-butylate in 40 cc. of tetrahydrofuran was slowly added.

The temperature of the mixture was allowed to raise to 20° C. Then the mixture was poured into water and extracted with ethyl ether. The extracts were washed with water, dried over sodium sulfate and evaporated to dryness under vacuum. The residue was taken up with 10 cc. of petroleum ether and heated to about 60° C. The mixture was then held at 0° C. for an hour. The precipitate was separated by filtration. There was obtained 1.78 gm. of 3,11β,17β-trimethoxy-17α-ethynyl-Δ$^{1,3,5(10)}$-estratriene, which melted at 116° C.

As far as is known, this compound is not described in the literature.

EXAMPLE 8

Preparation of 3-cyclopentyloxy-11β-methoxy-17α-ethynyl-Δ$^{1,3,5(10)}$-estratriene-17β-ol 1 gm. of 11β-methoxy-17α-ethynyl-Δ$^{1,3,5(10)}$-estratriene-3,17β-diol was dissolved in 15 cc. of tetrahydrofuran and 4 cc. of dimethylsulfoxide. The solution was agitated for 15 minutes at about 20° C. Then, 200 mgm. of a 50% sodium hydride suspension in paraffin oil were added thereto. A solution of 0.6 gm. of cyclopentyl bromide in 3 cc. of tetrahydrofuran was added dropwise. The reaction mixture was agitated for 14 hours at 20° C., then poured into water and extracted with ethyl ether. The combined extracts were successively washed with 0.1 N sodium hydroxide solution, with an aqueous sulfuric acid solution, with an aqueous sodium bicarbonate solution, with water, and then evaporated to dryness. The residue was taken up with benzene, chromatographed over silica gel and eluted with a benzene-ethyl acetate mixture. The eluate was evaporated. The residue was taken up with ethyl acetate. Petroleum ether was added and the mixture was ice-cooled. The precipitate was separated by filtration, washed with petroleum ether and dried. There were obtained 550 mgm. of 3-cyclopentyloxy-11β-methoxy-17α-ethynyl-$\Delta^{1,3,5(10)}$-estratriene-17β-ol, which melted at 79.5° C. and had a specific rotation $[\alpha]_D^{20} = +23.6° \pm 2°$ (c.= 0.4% in ethanol).

As far as is known, this compound is not described in the literature.

PHARMACOLOGICAL DATA

(A) Estrogenic activity (1) Rubin Test on mice.—The estrogenic activity was determined on female mice, 19 to 21 days old, by the Rubin Test (Endocrinology, vol. 49, p. 429 [1951]). Groups of mice received the test compounds once a day orally or subcutaneously for three days and on the fourth day, the animals were killed and the uterus of each animal was removed, dissected and weighed. When administered orally, the animals received varying dosages of the test compounds in 0.2 cc. of an aqueous suspension and when administered subcutaneously, the varying dosages were in 0.1 cc. of an oily suspension. The results are summarized in Tables I and II.

TABLE I.—ORAL ADMINISTRATION

| Test compound | Total dosages in γ | Uterus weight in mg. |
|---|---|---|
| 11β-methoxy-17α-methyl-$\Delta^{1,3,5(10)}$-estratriene-3,17β-diol | 0 | 11.9 |
| | 0.09 | |
| | 0.27 | 43.0 |
| | 0.81 | 69.3 |
| | 2.43 | 83.5 |
| Ethynyl estradiol | 0 | 11.9 |
| | 0.09 | 19.0 |
| | 0.27 | 35.0 |
| | 0.81 | 61.0 |
| | 2.43 | |
| 11β-methoxy-17α-ethynyl-$\Delta^{1,3,5(10)}$-estratriene-3,17β-diol | 0 | 17.8 |
| | 0.03 | 28.5 |
| | 0.09 | 38.6 |
| | 0.27 | 77.5 |
| | 0.81 | 110.6 |
| Ethynyl estradiol | 0 | 17.8 |
| | 0.03 | 18.4 |
| | 0.09 | 15.3 |
| | 0.27 | 24.9 |
| | 0.81 | 51.5 |

TABLE II.—SUBCUTANEOUS ADMINISTRATION

| Test compound | Total dosages in γ | Uterus weight in mg. |
|---|---|---|
| 11β-methoxy-17α-ethynyl-$\Delta^{1,3,5(10)}$-estratriene-3,17β-diol | 0 | 12.5 |
| | 0.01 | 16.9 |
| | 0.03 | 25.0 |
| | 0.09 | 54.7 |
| | 0.27 | 86.5 |
| Ethynyl estradiol | 0 | 12.5 |
| | 0.01 | |
| | 0.03 | 26.1 |
| | 0.09 | 46.7 |
| | 0.27 | 112.2 |

Table I shows that 11β-methoxy-17α-methyl-$\Delta^{1,3,5(10)}$-estratriene-3,17β-diol has an oral estrogenic activtiy of the same order as ethynyl estradiol while 11β-methoxy-17α-ethynyl-$\Delta^{1,3,5(10)}$-estratriene-3,17β-diol has a higher oral estrogenic activity than ethynyl estradiol. Table II shows that 11β-methoxy-17α-ethynyl-$\Delta^{1,3,5(10)}$-estratriene-3,17β-diol when administered subcutaneously has the same order of estrogenic activity as ethynyl estradiol.

(2) Lauson Test on rats.—The uterotrophic activity was determined on female rats, 22 to 23 days old, weighing about 40 gm. by the Lauson Test (Endocrinology, vol. 24 [1939], p. 35). The test compounds were administered to groups of rats orally twice a day in solution in olive oil admixed with 5% benzyl alcohol for 3 days. In a second test, the products were orally administered as an aqueous suspension (Table IV). On the fourth day, the rats were killed and the uterus of each was removed, vacuum dried and weighed. The results are shown in Tables III and IV.

TABLE III

| Test compound | Total dosages in γ | Uterus weight in mg. |
|---|---|---|
| 11β-methoxy-17α-methyl-$\Delta^{1,3,5(10)}$-estratriene-3,17β-diol | 0.00625 | 25.58 |
| | 0.0125 | 49.50 |
| | 0.025 | 80.02 |
| Ethynyl estradiol | 0.125 | 32.12 |
| | 0.250 | 57.32 |
| | 0.500 | 74.38 |
| 11β-methoxy-17α-methyl-$\Delta^{1,3,5(10)}$-estratriene-3,17β-diol | 0.00625 | 30.76 |
| | 0.0125 | 57.68 |
| | 0.025 | 82.34 |
| 17α-methyl-$\Delta^{1,3,5(10)}$-estratriene-3,17β-diol | 0.25 | 34.18 |
| | 0.50 | 52.16 |
| | 1.00 | 74.9 |
| 11β-methoxy-17α-ethynyl-$\Delta^{1,3,5(10)}$-estratriene-3,17β-diol | 0.0075 | 23.04 |
| | 0.0150 | 35.76 |
| | 0.030 | 58.96 |
| Ethynyl estradiol | 0.125 | 21.64 |
| | 0.250 | 41.74 |
| | 0.500 | 57.16 |

TABLE IV.—AQUEOUS SUSPENSION

| Test compound | Total dosages in γ | Uterus weight in mg. |
|---|---|---|
| 11β-methoxy-17α-methyl-$\Delta^{1,3,5(10)}$-estratriene-3,17β-diol | 0 | 24.0 |
| | 0.0046 | 29.1 |
| | 0.014 | 43.4 |
| | .042 | 69.0 |
| Ethynyl estradiol | 0 | 24.0 |
| | 0.125 | 26.8 |
| | 0.375 | 37.6 |
| | 1.125 | 66.5 |

The above tables show that in the rat, 11β-methoxy-17α-methyl-$\Delta^{1,3,5(10)}$-estratriene-3,17β-diol has a uterotrophic activity 20 to 25 times greater than ethynyl estradiol and 40 times greater than 17α-methyl-$\Delta^{1,3,5(10)}$-estratriene-3,17β-diol and that 11β-methoxy-17α-ethynyl-$\Delta^{1,3,5(10)}$-estratriene-3,17β-diol has a uterotrophic activity in rats, 20 times greater than ethynyl estradiol.

(3) Allen-Doisy Test.—The estrogenic activity on the vagina was determined by the Allen-Doisy Test as described by Feyel-Cabannes (C.R. Soc. Biol., vol. 150 [1956], page 1881), on groups of castrated rats. The rats received a single subcutaneous dose of the test compounds in solution in olive oil admixed with 5% benzyl alcohol or a single oral dose of the test compound in solution in olive oil. Vaginal smears were taken daily from the second day of treatment. The rat-unit (the dose which caused estrus in the rats within one day) of 11β-methoxy-17α-ethynyl-$\Delta^{1,3,5(10)}$-estratriene-3,17β-ol was 0.5γ by subcutaneous administration and 20γ by oral administration. The latter administration showed that the said product was about five times more active than ethynyl estradiol administered under the same experimental conditions. An oral dose of 20γ of 11β-methoxy-17α-methyl-$\Delta^{1,3,5(10)}$-estratriene-3,17β-diol showed a reduced estrus while a subcutaneous dose of 2γ of the same product showed estrus in 50% of the animals.

(B) Hypocholesterolemiant activity

Hypocholesterolemiant activity was determined on groups of female rats having an average weight of 200 gm. by daily administering the test compounds as suspensions in an aqueous dispersive liquid for 10 days. Blood samples were taken on the eleventh day to determine the amount of seric sterols and the results are summarized in Table V.

TABLE V

| Test compounds | Doses administered in γ/kg. | Seric sterols in gm. °/°° |
|---|---|---|
| Controls | 0 | 0.91 |
| 11β-methoxy-17α-methyl-Δ$^{1,3,5(10)}$-estratriene-3,17β-diol | 0.05 | 0.89 |
| | 0.10 | 0.88 |
| | 0.50 | 0.74 |
| | 1.00 | 0.62 |
| Ethynyl estradiol | 1 | 0.81 |
| | 5 | 0.72 |
| | 10 | 0.57 |

Table V shows that 11β-methoxy-17α-methyl-Δ$^{1,3,5(10)}$-estratriene-3,17β-diol has a distinct hypocholesterolemiant activity beginning at a daily dose of 1γ/kg. and is ten times more active than ethynyl estradiol.

Various modifications of the compositions and method of the invention may be made without departing from the spirit or scope thereof.

We claim:
1. An 11β-alkoxy-17α-hydrocarbyl-Δ$^{1,3,5(10)}$-gonatriene of the formula

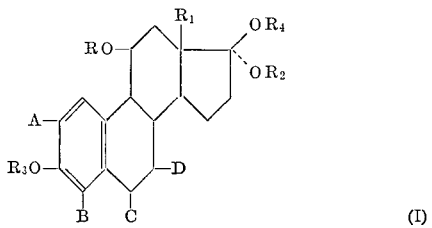

(I)

wherein R and $R_1$ are alkyl of 1 to 4 carbon atoms, $R_2$ is selected from the group consisting of alkyl of 1 to 7 carbon atoms, alkenyl and alkynyl of 2 to 7 carbon atoms and their halogenated derivatives, $R_3$ is selected from the group consisting of hydrogen, alkyl of 1 to 4 carbon atoms, cycloalkyl of 5 to 6 carbon atoms, and acyl of an organic carboxylic acid of 1 to 18 carbon atoms, $R_4$ is selected from the group consisting of hydrogen and alkyl of 1 to 4 carbon atoms, A, B and C are hydrogen and D is selected from the group consisting of hydrogen and lower alkyl.

2. A compound of claim 1 wherein $R_1$ and $R_2$ are methyl, R is selected from the group consisting of methyl and ethyl, $R_3$ is selected from the group consisting of hydrogen, alkyl of 1 to 4 carbon atoms and an acyl radical of an organic carboxylic acid of 1 to 18 carbon atoms, and $R_4$ is selected from the group consisting of hydrogen and alkyl of 1 to 4 carbon atoms.

3. A compound of claim 1 wherein R is selected from the group consisting of methyl and ethyl, $R_1$ is selected from the group consisting of methyl and ethyl, $R_2$ is ethynyl, $R_3$ is selected from the group consisting of hydrogen, alkyl of 1 to 4 carbon atoms, cycloalkyl of 5 to 6 carbon atoms and an acyl radical of an organic carboxylic acid of 1 to 18 carbon atoms, and $R_4$ is selected from the group consisting of hydrogen and alkyl of 1 to 4 carbon atoms.

4. A compound of claim 1 wherein the compound is 11β-methoxy-17α-methyl-Δ$^{1,3,5(10)}$-estratriene-3,17β-diol.

5. A compound of claim 1 wherein the compound is 11β-methoxy-17α-(2′-methyl) allyl-Δ$^{1,3,5(10)}$-estratriene-3,17β-diol.

6. A compound of claim 1 wherein the compound is 11β-methoxy-17α-ethynyl-Δ$^{1,3,5,(10)}$-estratriene-3,17β-diol.

7. A compound of claim 1 wherein the compound is 11β-methoxy-17α-but-2′-ynyl-Δ$^{1,3,5(10)}$-estratriene 3,17β-diol.

8. A compound of claim 1 wherein the compound is 11β-ethoxy-17α-methyl-Δ$^{1,3,5(10)}$-estratriene-3,17β-diol.

9. A compound of claim 1 wherein the compound is 11β-isopropoxy-17α-methyl-Δ$^{1,3,5(10)}$-estratriene-3,17β-diol.

10. A compound of claim 1 wherein the compound is 11β-methoxy-17α-ethyl-Δ$^{1,3,5(10)}$-estratriene-3,17β-diol.

11. A compound of claim 1 wherein the compound is 11β-ethoxy-17α-ethynyl-Δ$^{1,3,5(10)}$-estratriene-3,17β-diol.

12. A compound of claim 1 wherein the compound is 11β-propoxy-17α-ethynyl-Δ$^{1,3,5(10)}$-estratriene-3,17β-diol.

13. A compound of claim 1 wherein the compound is 3,11β-dimethoxy-17α-ethynyl-Δ$^{1,3,5(10)}$-estratriene-17β-ol.

14. A compound of claim 1 wherein the compound is 7α-methyl-11β-methoxy-17α-ethynyl-Δ$^{1,3,5(10)}$-estratriene-17β-diol.

15. A compound of claim 1 wherein the compound is 11β-methoxy-13β-ethyl-17α-ethynyl-Δ$^{1,3,5(10)}$-gonatriene-3,17β-diol.

16. A compound of claim 1 wherein the compound is 3,11β-dimethoxy-17α-methyl-Δ$^{1,3,5(10)}$-estratriene-17β-ol.

17. A compound of claim 1 wherein the compound is 3,11β,17β-trimethoxy-17α-ethynyl-Δ$^{1,3,5(10)}$-estratriene.

18. A compound of claim 1 wherein the compound is 3-cyclopentyloxy-11β-methoxy-17α-ethynyl-Δ$^{1,3,5(10)}$-estratriene-17β-ol.

19. A compound of claim 1 wherein the compound is 11β-methoxy-17α-chloroethynyl-Δ$^{1,3,5(10)}$-estratriene-3,17β-diol.

20. A compound of claim 1 wherein the compound is 11β-methoxy-17α-vinyl-Δ$^{1,3,5(10)}$-estratriene-3,17β-diol.

No references cited.

HENRY A. FRENCH, Primary Examiner

U.S. Cl. X.R.

260—239.5, 239.55; 424—238

UNITED STATES PATENT OFFICE
CERTIFICATE OF CORRECTION

Patent No. 3,579,545                    Dated May 18, 1971

Inventor(s) DANIEL BERTIN and ANDRE PIERDET

It is certified that error appears in the above-identified patent and that said Letters Patent are hereby corrected as shown below:

IN THE CLAIMS

CLAIM 1 should read as follows in the formula

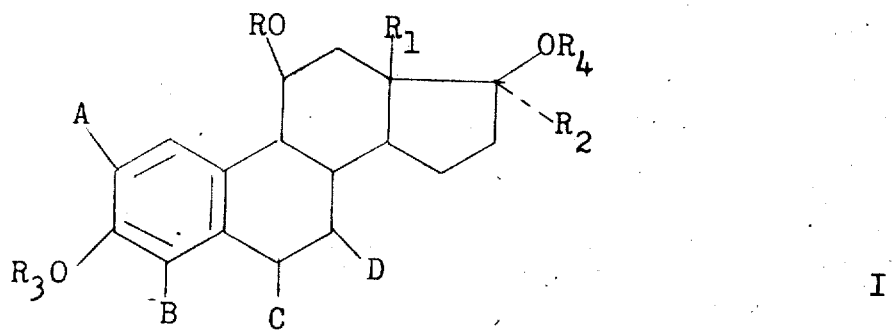

I

Signed and sealed this 27th day of June 1972.

(SEAL)
Attest:

EDWARD M. FLETCHER, JR.            ROBERT GOTTSCHALK
Attesting Officer                  Commissioner of Patents